United States Patent [19]

Jonason

[11] 4,380,106

[45] Apr. 19, 1983

[54] ASSEMBLY APPARATUS

[75] Inventor: Karl G. Jonason, Västerås, Sweden

[73] Assignee: Gränges Metallverken Aktiebolag, Västerås, Sweden

[21] Appl. No.: 202,419

[22] Filed: Oct. 30, 1980

[30] Foreign Application Priority Data

Nov. 2, 1979 [SE] Sweden .......................... 7909122

[51] Int. Cl.³ .......................................... B23P 15/26
[52] U.S. Cl. .............................. 29/157.3 A; 228/183; 29/726; 414/745; 414/746
[58] Field of Search ................. 228/183; 29/157.3 A, 29/157.3 B, 726, 727, 157.3 R; 414/745, 746

[56] References Cited

U.S. PATENT DOCUMENTS

| | | | |
|---|---|---|---|
| 1,996,566 | 4/1935 | Boerger | 29/726 |
| 2,006,383 | 7/1935 | Boerger | 29/726 |
| 2,796,037 | 6/1957 | Boorman | 29/726 |
| 3,431,620 | 3/1969 | Carlson | 29/726 |

FOREIGN PATENT DOCUMENTS

| | | | |
|---|---|---|---|
| 28400 | 5/1981 | European Pat. Off. | 29/726 |
| WO80/00228 | 2/1980 | PCT Int'l. Appl. | 29/726 |
| 1449296 | 9/1976 | United Kingdom | |
| 1525761 | 9/1978 | United Kingdom | |

Primary Examiner—Francis S. Husar
Assistant Examiner—V. K. Rising
Attorney, Agent, or Firm—Spencer & Kaye

[57] ABSTRACT

An apparatus for assembling cooling tubes and fin elements in the manufacture of heat exchangers, particularly radiators for motor vehicles, comprises stations for feeding the tubes and the fin elements to grooves in a rotatable drum. A tube and a fin element are positioned together in each groove, and are then ejected together at an ejecting station by an expelling device. An advancing means advances the tube and the fin element along a transportation path. The tubes and the fin elements are soldered to form units during their passage along the transportation path through a soldering station. The expelling device initially operates at a fast speed to eject the tubes and fins and then operates at a second slower speed to advance, in cooperation with the advancing means, the tubes and fins along the transportation path.

11 Claims, 3 Drawing Figures

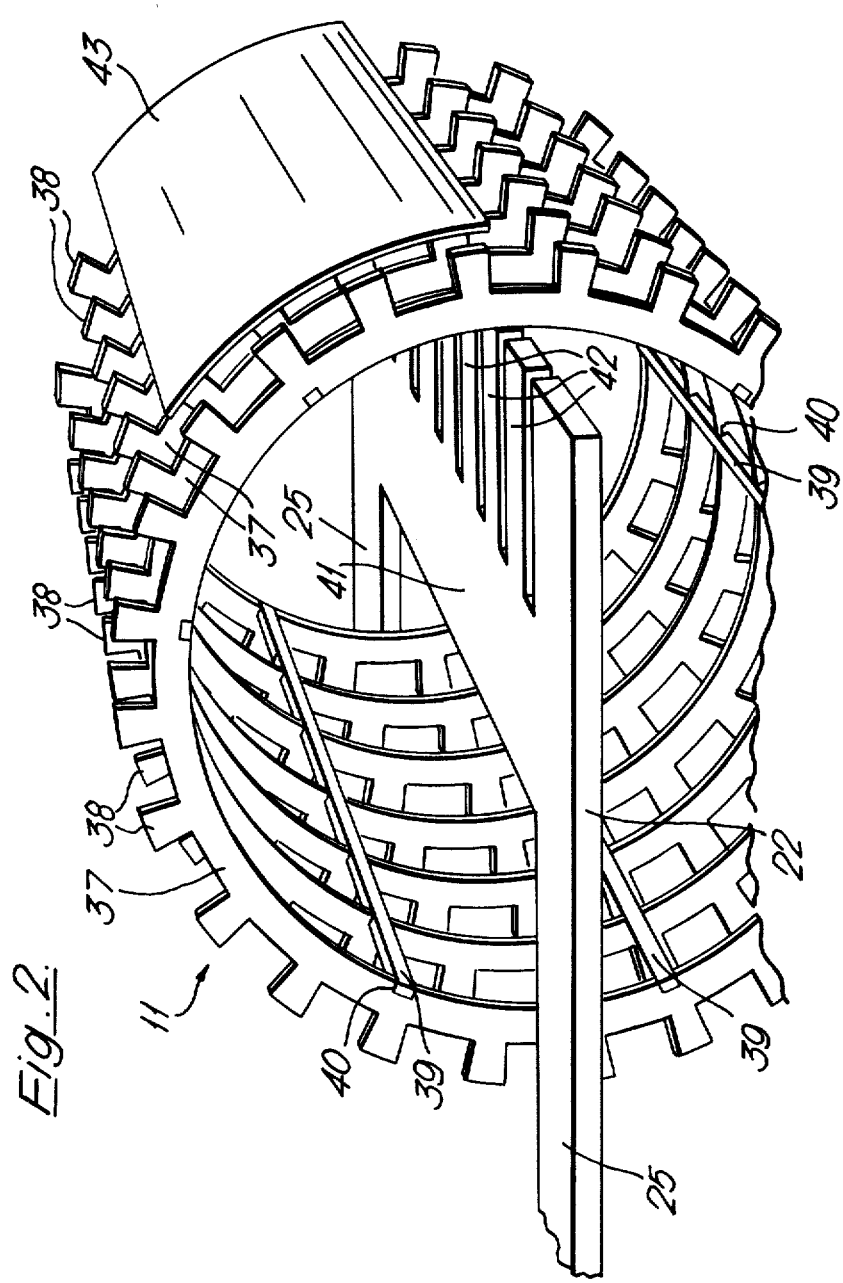

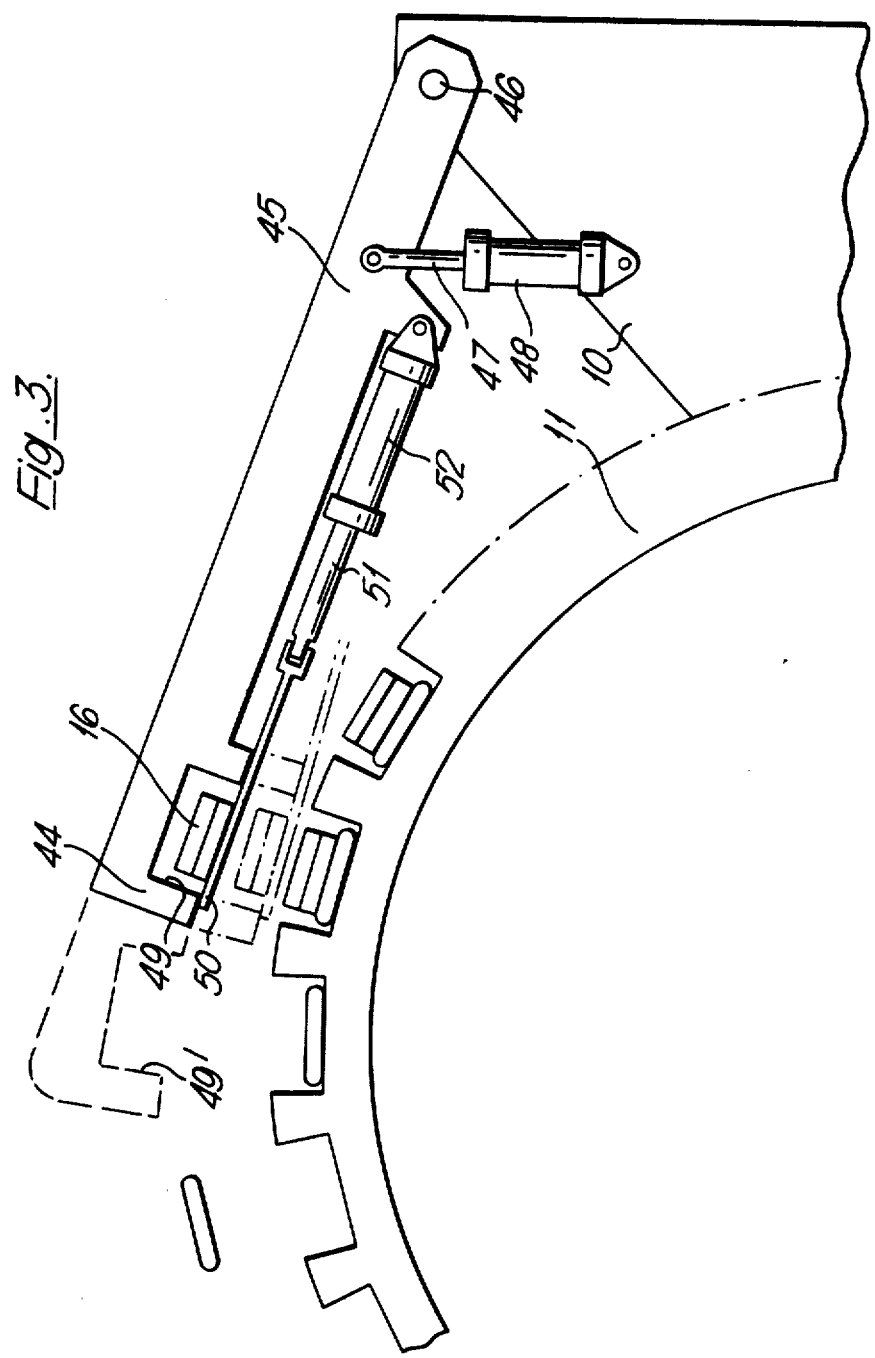

ASSEMBLY APPARATUS

FIELD OF THE INVENTION

The present invention relates to an apparatus for assembling a heat exchanger core comprising tubes and associated fin elements in thermal contact with the tubes. Such heat exchanger cores are often used in radiators for use in motor vehicles.

BACKGROUND OF THE INVENTION AND PRIOR ART

It has been proposed to produce a core for a heat exchanger, such as a radiator for an automobile by making an assembly which comprises thin tubes and fin elements in an alternate relationship. The cooling tubes are usually made of copper or brass. The fin elements are then usually manufactured of tapes of copper or brass. During the manufacture of the assembly the tubes and the fin elements are tinned and are then joined together by soldering.

When carrying out the soldering operation it is usual to advance the alternate tube and fin elements along a transportation path through a heating device which provides a sufficient high temperature to melt a tin coating formed on the elements during a preparatory tinning step, so that the abutting elements are joined by soldering when the temperature is reduced after the passage of the elements through the heating device. In order to obtain strong soldered connections, it is necessary that the tubes and the fin elements abut against each other with a firm constant pressure. Devices for providing such a constant pressure, such as devices which provide a pressure opposing the advancing of the elements have been suggested. International patent application No. PCT/SE79/00153, published under International Publication No. WO 80/00228 on Feb. 21, 1980 discloses an apparatus for assembling a heat exchanger core in which an assembly of fin elements and tubes, which are pre-tinned, are passed sequentially through a heating zone and a cooling zone. The assembly is driven forwardly into the heating and cooling zones by two co-operating conveyor belts, and two further co-operating conveyor belts at the point of discharge from the cooling zone act to provide a force in the reverse direction so that the elements are abutted firmly together. Thus the described apparatus is complex.

British patent specification No. 1,449,296 relates to an apparatus for assembling a heat exchanger in which tubes and fin elements are assembled to form a stack, and the stack is advanced with stepped synchronism with successive deliveries of tubes or fin elements at an assembly station. Co-operating pinch rollers act to provide a force to make the elements abut together during a soldering process, but since the stack advances in stepped synchronism, the operation of the pinch rollers is complex.

British patent specification No. 1,525,761 discloses a similar method of assembling a heat exchanger core, but in this method the ends of the tubes forming part of an assembly of tubes and fin elements are linked together before the soldering step to urge the components of the assembly together. The specification also describes an alternative method the ends of the tubes are meshed with advancing chains that perform the same function. This complex devices are provided for maintaining the elements of the assembly in firm contact with each other during the soldering process.

U.S. Pat. No. 3,431,620, describes a further apparatus for assembling tubes and fin elements to form a heat exchanger core in which the tubes and fin elements are automatically assembled in a stack. The stack is then removed by a clamping gauge, and the usual tanks are connected to the elements to form a radiator. There is no disclosure that the elements are soldered or otherwise connected directly together.

It is to be appreciated that where the elements of a heat exchanger are to be advanced through a heating device to solder the elements together the elements should be advanced with an even speed and without shocks. If a shock occurs at the moment, when the molten tin in a prospective soldered seam is going to solidify, the shock can give rise to a substantial deterioration of the soldered seam. When the tubes and the fin elements are arranged in an alternate relationship to form a stack in an assembling device and are advanced to a transportation path by means of an expelling device positioned in or adjacent the assembling device and designed to drive the elements against an existing counterpressure, it is very difficult to avoid shocks in the row of abutting elements.

It is to be understood that with regard to both the manufacturing costs and the quality of the finished product it is desirable to use a continuous soldering procedure of the type described above, provided that the pressure between the adjacent elements that are to be soldered can be kept constant, and shocks and an uneven speed in the transportation path can be avoided.

OBJECT OF THE INVENTION

The main object of the invention is to provide an assembling apparatus enabling a continuous and even ejection and advance of tubes and fin elements arranged in an alternate relationship, so that a continuous soldering or interconnecting precedure can be used for the elements, when they pass along a transportation path.

SUMMARY OF THE INVENTION

This invention provides an apparatus for assembling a heat exchanger core comprising tubes and associated fin elements in thermal contact with the tubes said apparatus comprising a means for receiving the tubes and the fin elements and delivering these elements in an alternate relationship to a transportation path, means arranged adjacent the transportation path for interconnecting the adjacent tubes and fin elements, a removing or ejecting device for expelling the tubes and the fin elements from the receiving means to the transportation path in the direction of transportation of tubes and fin elements along the transportation path, and advancing means which cooperate with said removing or ejecting device to advance the tubes and the fin elements along the transportation path, wherein the said removing or ejecting device has operating means which cause the removing or ejecting device, during each expelling cycle of operation, firstly to move in the forward direction to expel a tube and fin element from said receiving means at first speed and secondly to move in the forward direction at a second speed, slower than said first speed, to advance the tubes and fin elements along said transportation path, said second speed being substantially equal with the advancing speed of the advancing means, the arrangement being such that the tubes and the fin elements are brought into abutment against each other and are then moved continuously and with a substantially even speed along the transportation path past the means for interconnecting the adjacent tubes and the fin elements.

The ejecting device for the alternate tube and fin elements is caused to cooperate with the advancing means providing the further advance of the elements on the transportation path in such a way that the elements are advanced alternately by the expelling device and the advancing means, so that a smooth and continuous advance of the elements on the transportation path can be performed.

Preferably the advancing means consist of seizing means arranged to perform a reciprocating movement in the direction of movement of the tubes and fin elements along the transportation path.

The receiving means and the advancing means may be attached to a support frame arranged to perform a reciprocating movement in the direction of movement of the tubes and fin elements along the transportation path, the movement of the support frame providing the reciprocating movement of the advancing means.

Advantageously the receiving means is a rotatable drum which is provided at its periphery with a number of grooves which are parallel with the axis of the drum and each of which is dimensioned to receive one tube and one fin element, the drum being rotatable so that the grooves move from a feeding position at which said tubes and fin elements are introduced to the drum to an ejecting position, at which the tubes and fin elements are expelled from the drum.

The removing or ejecting device may be stationary and may comprise a movable expeller positioned within the receiving means which expeller has two operation speeds in the forward direction. The advancing means may be positioned in close proximity to the point where the tubes and the fin elements are expelled from the receiving means.

Preferably the advancing lengths of the expelling device and the advancing means together are equal with the dimension of the combination of a tube and a fin element in the direction of movement of the tubes and fin elements along the transportation path.

Conveniently the advancing lengths of the expelling device and the advancing means are each of substantially equal length.

In one embodiment of the invention the removing or ejecting device is stationary and comprises a movable expeller positioned outside the receiving means and arranged to pull out the tube and the fin element from the receiving means.

This invention also provides a method of assembling a heat exchanger core comprising tubes and associated fin elements in thermal contact with the tubes, said method comprising sequentially feeding tubes and fin elements to a receiving means, delivering the tubes and fin elements to a transportation path by means of a removing or ejecting device which operates in the forward direction at a first speed to expel a tube and fin element from the receiving means and which then operates in the forward direction at a second slower speed, the removing or ejecting device then cooperating with advancing means which operate at a speed substantially equal to said second slower speed, so that tubes and fin elements in alternate relationship are advanced along said transportation path, and causing the tubes and fin elements to pass means which interconnect the adjacent tubes and fin elements.

The invention also relates to a heat exchange with a core made by such a method.

BRIEF INTRODUCTION TO THE DRAWINGS

The invention will now be described, by way of example, with reference to the accompanying drawings in which:

FIG. 2 is a schematic perspective view on an enlarged scale of a portion of the rotatable drum on a larger scale;

FIG. 3 is a schematic side elevational view on an enlarged scale of the feeding device for the fin elements of the apparatus shown in FIG. 1.

DESCRIPTION OF PREFERRED EMBODIMENT

Figure 1:
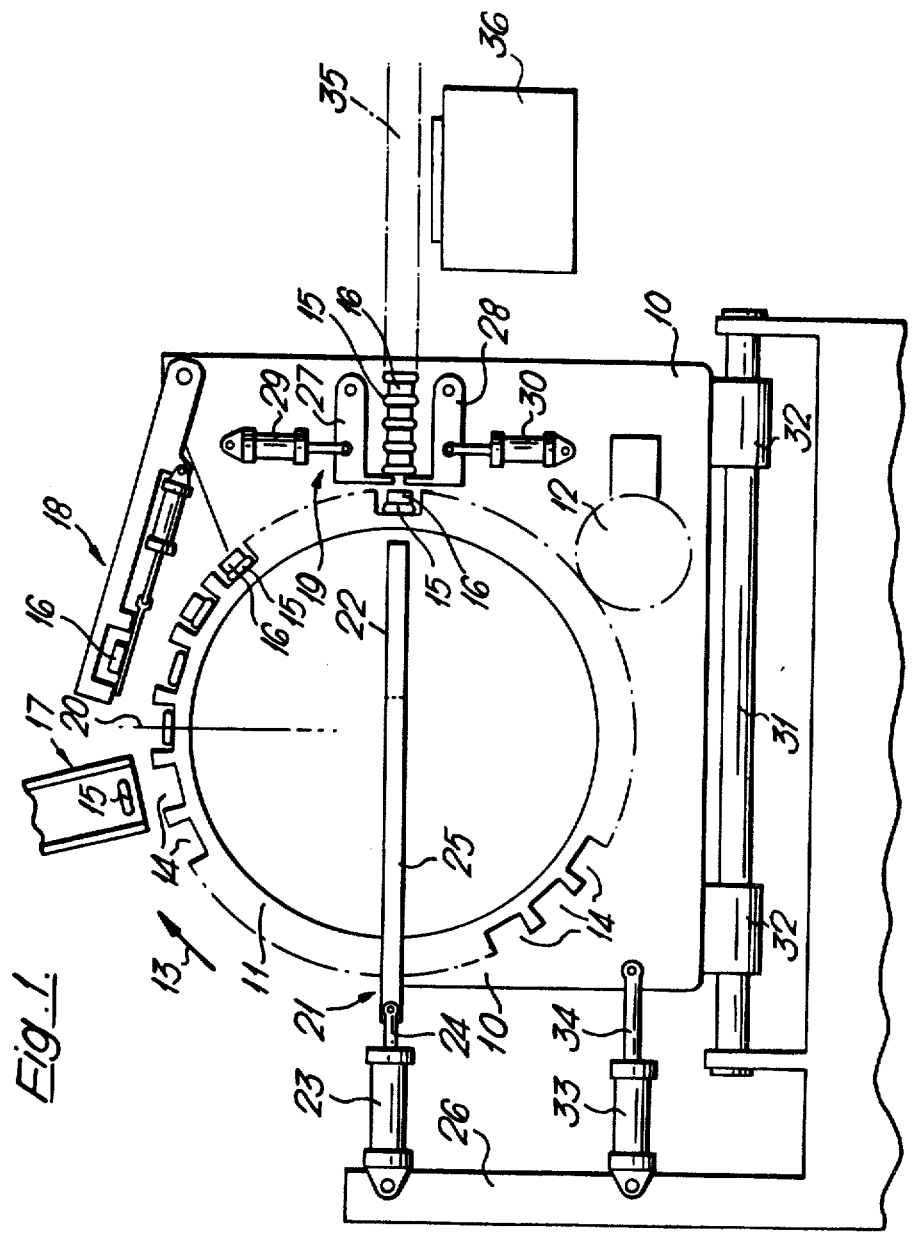
FIG. 1 is a schematic side elevational view of an assembling apparatus in accordance with the invention, and for assembling a heat exchanger core having a rotatable drum.

The apparatus schematically shown in FIG. 1, which is an apparatus for assembling a heat exchanger core, comprising a support frame 10 on which a drum 11 is rotatably mounted in appropriate bearings (not shown). The drum 11 is arranged to be rotated stepwise about its longitudinal axis by a stepping device 12 which may for example comprise a cog wheel driven by a pneumatic piston or a corresponding device. The stepping device 12 acts to drive the drum 11 in a clockwise direction, as indicated by the arrow 13. It is to be appreciated that the stepping device may be of any conventional type and, therefore, it has not been shown or described in detail.

The drum 11 is provided with a plurality of parallel axially extending grooves 14 in the periphery of the drum, the grooves being equispaced. Only a few of the grooves are shown in FIGS. 1 and 3. Each groove has a width and depth such that it can contain one cooling tube 15 and one fin element 16 simultaneously. The construction of the drum will be described hereinafter in greater detail.

Three work stations 17, 18, 19 are positioned about the circumference of the drum. The stations are supported by the support frame 10.

The first work station 17 is intended for feeding tinned tubes 15 into the grooves 14 drum 11. One tube 15 has been schematically indicated in the station 17. The tubes are normally flat and thus have a substantially rectangular cross section. The tubes 15 are comparatively stiff and resistant and, therefore, the feeding of the tubes 15 to the grooves 14 does not present any problem. A feeding device selected from a larger number of a conventional types can be used. For example a device may be used which includes a vertical stack of tubes, and which can delivery one tube each time a groove in the drum is present immediately under the stack.

The second station 18 is intended for feeding tinned flexible fin elements into the grooves 14 in the drum 11, and this station is shown more in detail in FIG. 3 and will be described hereinafter.

In the presently described apparatus, both the first station and the second station are arranged to let the elements which are to be fed into the grooves 14 of the drum 11 drop down into the grooves under the influence of gravity. During the actual feeding operation, these stations must be positioned substantially above the groove 14 into which the respective element is going to drop. Therefore, the stations are positioned adjacent the upper portion of the circumference of the drum on either side of a vertical line 20 passing through the centre of the drum. It is desirable to position the feeding stations 17 and 18 as close as possible to the vertical line 20, because this will ensure that the feeding operation is reliable.

The third station 19 is a removing or ejecting station and comprises a device 21 for removing or ejecting the tube and the fin element which are present in each groove 14 when the groove is advanced to the station 19. The removing or ejecting device consists of an expeller 22, which is been more clearly shown in FIG. 2 and which will be described more in detail below, and an associated driver consisting of a pneumatic cylinder 23 having a piston 24. The piston is attached to two arms 25 of the expeller, the arms extending towards the driver. The pneumatic cylinder 23 is rigidly attached to a stationary wall 26 and, thus, is not displaceable. The movement of the cylinder piston 24 is transferred directly to the expeller 22 to cause the expeller to perform a reciprocating movement.

The tube and the fin element introduced to each groove at the stations 17 and 18 are ejected during the forward movement of the expeller (to the right in FIG. 1). The station 19 also comprises two movable hooks 27, 28, positioned in front of and in close vicinity to the groove 14 which is present at the station 19. The hooks are controlled by means of two pneumatic cylinders 29, 30 attached to the support frame 10 on which the drum is supported. The hooks are controlled so as to open at the moment when a tube and an associated fin element are expelled from the groove of the drum and to close when the expelled elements have been advanced so far that the hooks can be moved so that their free ends are located behind the expelled elements.

The frame 10, that carries the drum 11 is slidably mounted and retained on two parallel guides 31, one of which only is shown in FIG. 1. The guides are parallel with the path of movement of the expeller. The frame 10 is supported on bearings 32 which are slidably mounted on the guides 31. The carriage is caused to perform a reciprocating movement along the guides 31 by means of a pneumatic cylinder 33 which is attached to the stationary wall 26, the piston 34 associated with the cylinder 33 is attached to the frame 10. The reciprocating movement of the frame 10 cooperates with the reciprocating movement of the expeller 22 in such a way that the ejected elements are further advanced to a transportation path 35 by the hooks 27, 28 which are attached to the frame.

The forward movement of the expeller 22 is performed with two speeds during an expelling process. Initially the expeller operates with a high speed so that the expelled elements can join the previously expelled elements, and then the expeller operates at a lower speed corresponding to the desired speed of transportation of the elements on the transportation path to effect such transportation. This provides a smooth and shock-free advancing of the elements on the transportation path.

A heater 36, e.g. a gas burner or an electric heat source, is positioned adjacent the transportation path 35 for heating the tinned tubes and fin elements to such a temperature that the tinning melts, so that the tubes and the fin elements which are pressed together become soldered to each other. The row of soldered elements coming from the heater 36 is divided into units of suitable size by including non-tinned or non-solderable elements (so called dummy elements) between two fin elements at suitable intervals.

A portion of the drum 11 used in the apparatus of FIG. 1 is shown on a larger scale in FIG. 2. The drum is constructed of a number of identical rings 37 each having a plurality of radially extending teeth 38 at their outer periphery. The rings are spaced from each other in axially aligned parallelism and are retained by means of a number of axially extending spacers 39 positioned in grooves 40 formed in the radially inner peripheries of the separate rings. The rings are so positioned in relation to each other that the radially extending teeth 38 form parallel rows which are parallel with the axis of the drum. The spaces between the teeth define the peripheral grooves 14 of the drum into which the tubes and the fin elements are to be fed. The drum is provided with two bearing rings (not shown), one at each end. The bearing rings are rotatably mounted in bearings in the frame 10 by conventional means, so that the drum can rotate about its longitudinal axis, which should be substantially horizontal. By utilising this design the mass of the drum can be kept relatively small.

The expeller 22 is partially located within the drum. The expeller consists of a plate 41 having a number of horizontally extending ejection teeth 42, the number of which is equal with the number of spaces between the spaced rings 37 of the drum 11. The teeth 42 are positioned in alignment with such spaces, so that the teeth can project into the spaces between the rings and thus into the groove 14 at the periphery of the drum which has been advanced to the removing or ejecting station 18 to expel the tube and fin elements present in the groove. The plate 41 of the expeller is provided with the above mentioned two arms 25, which extend from the edge of the plate opposite to the teeth 42 and which are attached to the cylinder 23 of the expelling device.

A curved cover plate 43 is positioned adjacent the periphery of the drum 11 above the removing or ejection station 19. The cover plate has a radius of curvature that is substantially equal to the radius of the periphery of the drum and is positioned adjacent the circumference of the drum, so that the tube and fin elements present in the grooves 14 of the drum 11 can not drop out of the grooves during the rotation of the drum, when the grooves are moved from the feeding stations 17 and 18 to the removing or ejection station 19.

The feeding station for the fin elements is shown in more detail in FIG. 3 and comprises a head 44 which is supported on an extending arm 45. The arm 45 is pivotally mounted at its free end on a shaft 46 that is attached to the support frame 10. The piston 47 of a pneumatic cylinder 48 which is mounted on the support frame 10 is connected to the arm 45, so that by activating the pneumatic cylinder, the arm can be caused to perform a reciprocating movement, so that the head 44 can be brought to a position adjacent the periphery of the drum (indicated in FIG. 3 by dashed lines) and then back to the starting position. The head 44 is provided in the under surface with a U-shaped groove 49 which is open downwards. The downwardly directed opening of the groove is covered by a slidable plate 50 forming a lower bottom cover for the groove. The plate 50 is attached to a piston 51 of a pneumatic cylinder 52 which is attached to the arm 45. The plate 50 can be pulled rapidly aside to uncover the opening of the groove by actuating the cylinder 52. A fin element 16 present in the groove will then drop out from the head 44. The pneumatic cylinders 48, 52 are controlled in such a way that the head 44 is moved downwards towards the drum 11 and the plate 50 is pulled aside, when a groove of the drum is present immediately below the groove 49 of the head 44, so that the fin element present in the groove is caused to drop down into the groove of the drum. The fin element can drop down into the groove of the drum under the influence of gravity, but pressurized air can also be used to speed up or ensure the transfer of the fin element to the groove of the drum.

The provision of a separate groove or box into which the fin element is fed before being transferred to the groove of the drum achieves two very important advantages. Firstly, the walls and the bottom of the groove can be made of a material and in a way such that the friction during the feeding of the fin element into the respective groove in the drum is reduced to a minimum. Secondly, a long period of time is obtained for the movement of the fin element to a position above the drum, because the periods of time during which the drum is rotating can be utilized for this purpose as will now be explained.

The fin elements are usually made of a folded flexible tape. It is therefore highly desirable that this tape can be fed into a groove, the tape thus becoming folded. The tape is then cut to form a fin element of the correct length. If the tape were fed directly into a groove of the drum, the drum would have to be at a standstill during this feeding operation. The horizontal feeding of the tape with the associated folding of the tape to provide a fin in the correct position with regard to the vertical centre axis of the drum is a difficult and therefore time consuming operation. Thus the drum would have to be stationary for a long period of time resulting in a low overall production rate. However, in the presently described device the tape is fed to the groove 49 in the head 44, and the tape is folded within that groove, and then cut to the correct length. When the folded tape is positioned over a groove the plate 50 is withdrawn and the resultant fin element downwardly is performed very rapidly, even though the tape or fin element is very flexible, fragile and difficult to handle. Thus the provision of a separate feed groove for the fin element above the drum gives the apparatus a high operation speed and good reliability. Furthermore, the fact that the separate groove is in a head which is movable with regard to the drum renders the feeding of the fin elements into the groove of the drum more reliable and eliminates the risk that the fin element may be squeezed by the edge of the movable plate, since the head can be retracted to the starting position, which is at a relatively large distance from the periphery of the drum, before the plate 50 is pushed back to close the groove in the drum.

The period of time available for the horizontal feeding of the tape from which the fin element is to be made can be further extended if two parallel grooves are provided in the movable head (a second groove 49' is shown in phantom in FIG. 3), so that two fin elements can be simultaneously prepared and positioned above the drum and then can be simultaneously dropped into adjacent separate grooves of the drum. Then, the transfer of fin elements to the drum only has to take place at every second step of the drum, and a period substantially equal to the duration of two steps of the drum is available for the feeding of the tape, and the folding of the tape to make a fin.

The substantial extension of the period of time available for making the fin elements renders the feeding operation much more reliable.

In the embodiment of the invention illustrated in the accompanying drawings and described above, the tube is fed first to the groove of the drum and the fin element is transferred to the groove afterwards, so that the fin element is positioned on top of the tube. This is necessary due to the design of the drum, since the grooves at the periphery of the drum have no continuous bottoms. However, if the drum is so designed that the grooves have continuous bottoms, the fin elements can be fed to the grooves first. In view of the high fragility of the fin elements, it is usually preferable to feed the tube first, because the tube will then give a good support to and a good protection of the fin element during the ejection from the grooves of the drum.

The station for feeding the tubes can be preferably provided with an additional device for enabling the insertion at intervals of dummy elements, i.e. elements which are not intended for soldering to an adjacent fin element. The soldered elements coming from the soldering zone can thus easily be split up into units or sections of a desired size.

It will be appreciated that the fins may be made of very thin metal strip without the fins being damaged during manufacture of the heat exchanger core.

As can be appreciated from FIGS. 1 and 3 the drum of the device is turned one step at a time, the step corresponding to the distance between two adjacent grooves at the periphery of the drum. When a groove is positioned right under the first station, a tube is fed into that groove. The groove is then moved by the rotation of the drum two steps to the second station, where a fin element is fed into the groove and positioned on top of the tube. The groove is thus filled up and is moved by the further rotation of the drum about 90° to the removing or ejecting station, where the tube and the fin element are expelled from the groove by the expelling device. The ejected elements are then advanced by means of the movable hooks 27, 28 and the reciprocating movement of the frame 10 to the transportation path on which the elements then are advanced through the heater for soldering the abutting elements.

The elements are fed to the drum in a horizontal orientation, but are expelled from the drum in a substantially vertical orientation as a result of the 90° rotation of the drum between the feeding station and the expelling station.

The apparatus described above is so designed that the movable hooks 27,28 are attached to the frame 10 carrying the receiving means 11 for the tubes and the fin elements and that the carriage performs a reciprocating movement. In this way the advancing hooks can be positioned at a very small distance from the point where the elements are expelled from the receiving means, thus facilitating the guidance of the elements which are ejected in a vertical orientation. This distance is kept constant during the operation of the apparatus. Whilst it is not essential that the advancing means and the receiving means move together, since the advancing means can move with regard to the receiving means, it is much more difficult to provide a small distance between the receiving means and the advancing means during the ejection of the elements if the receiving means and the advancing means do not move together. Furthermore, in the last mentioned case it is very difficult to keep the distance constant due to mechanical wear in the apparatus. If the distance between the receiving means and the advancing means is kept small, the path for the expelled elements before they join the previously ejected elements will be relatively short, so that the difference between the two operation speeds of the expelling device can be kept small. In this way the possibility of eliminating shocks in the row of elements, when the new elements are ejected, is further increased.

Since the receiving means delivers or ejects one tube together with one fin element in a pair, the advantage is obtained that the ejected elements together have a constant thickness even when the fin element is substantially thicker than the tube, which is usually the case. This will further facilitate the achievement of a continuous and shockfree expulsion of elements from the receiving means. The advancing distances of the ejecting device and the advancing means are together substantially equal with the dimension of a tube and a fin element in the direction of the transportation path and are preferably of about equal length.

It is evident that many embodiments are possible within the scope of the invention. It is not necessary for the receiving means to be a drum. Any device that can arrange the tubes and the fin elements in an alternate relationship and deliver the elements to a transportation path can be used. The hooks can furthermore be replaced by any seizing means. The control of the seizing means can also be provided in many different ways. The seizing means do not have to perform a reciprocating movement, but can, for example be caused to move in a ring shaped path. The expeller can be a pushing or a pulling means. If a pulling means is used, the receiving element itself can be arranged to provide the advancing of the tubes and the fin elements, and the seizing means can be omitted. The advance movement can also be divided in many ways between the ejecting device and the advancing means, so that these means contribute with portions of different lengths during one cycle. However, the most even and smooth advance operation is most likely to be obtained when the advancing lengths of the ejecting device and the advancing means are of about equal length.

What is claimed is:

1. An apparatus for assembling a heat exchanger core comprising tubes and associated fin elements in thermal contact with the tubes said apparatus comprising a means for receiving the tubes and the fin elements and delivering these elements in an alternate relationship to a transportation path, means arranged adjacent the transportation path for interconnecting the adjacent tubes and fin elements, an ejecting device for expelling the tubes and the fin elements from the receiving means to the transportation path in the direction of transportation of tubes and fin elements along the transportation path, and advancing means which cooperate with said removing or ejecting device to advance the tubes and the fin elements along the transportation path, wherein the said ejecting device has operating means which cause the removing or ejecting device, during each expelling cycle of operation, firstly to move in the forward direction to expel a tube and fin element from said receiving means at first speed, and secondly to move in the forward direction at a second speed, slower than said first speed, to advance the tubes and fin elements along said transportation path, said second speed being substantially equal with the advancing speed of the advancing means, the arrangement being such that the tube and the fin elements are brought into abutment against each other and are then moved continuously and with a substantially even speed along the transportation path past the means for interconnecting the adjacent tubes and the fin elements.

2. An apparatus according to claim 1, wherein the advancing means consist of seizing means arranged to perform a reciprocating movement in the direction of movement of the tubes and fin elements along the transportation path.

3. An apparatus according to claim 2, wherein the receiving means and the advancing means are attached to a support frame arranged to perform a reciprocating movement in the direction of movement of the tubes and fin elements along the transportation path, the movement of the support frame providing the reciprocating movement of the advancing means.

4. An apparatus according to claim 1, wherein the receiving means is a rotatable drum which is provided at its periphery with means which define a number of grooves which are parallel with the axis of the drum and each of which is dimensioned to receive one tube and one fin element, the drum being rotatable so that the grooves move from a feeding position at which said tubes and fin elements are introduced to the drum to an ejecting position, at which the tubes and fin elements are expelled from the drum.

5. An apparatus according to claim 1, wherein the ejecting device is stationary and comprises a movable expeller positioned within the receiving means which expeller has two operation speeds in the forward direction.

6. An apparatus according to claim 2, wherein the advancing means are positioned in close proximity to the point where the tubes and the fin elements are expelled from the receiving means.

7. An apparatus according to claim 1, wherein the distance of travel of the expelling device and the advancing means together are equal to the dimension of the combination of a tube and a fin element in the direction of movement of the tubes and fin elements along the transportation path.

8. An apparatus according to claim 1, wherein the distance of travel of the expelling device and the advancing means are each of substantially equal length.

9. An apparatus according to claim 1, wherein the receiving means is dimensioned to receive one tube and one fin element together as a pair.

10. An apparatus according to claim 1, wherein the removing or ejecting device is stationary and comprises a movable expeller positioned outside the receiving means and arranged to pull out the tube and the fin element from the receiving means.

11. A method of assembling a heat exchanger core comprising tubes and associated fin elements in thermal contact with the tubes wherein said method comprising sequentially feeding tubes and fin elements to a receiving means, delivering the tubes and fin elements to a transportation path by means of a removing or ejecting device which operates in the forward direction at a first speed to expel a tube and fin element from the receiving means and which then operates in the forward direction at a second slower speed, the removing or ejecting device then cooperating with advancing means which operate at a speed substantially equal to said second slower speed, so that tubes and fin elements in alternate relationship are advanced along said transportation path, and causing the tubes and fin elements to pass means which interconnect the adjacent tubes and fin elements.

* * * * *